S. C. TAFT.
Car-Brakes.

No. 153,286.

Patented July 21, 1874.

WITNESSES:
Chas. Nida
Sedgwick

INVENTOR:
S. C. Taft
BY
ATTORNEYS.

UNITED STATES PATENT OFFICE.

STEPHEN C. TAFT, OF FRANKLIN, MASSACHUSETTS.

IMPROVEMENT IN CAR-BRAKES.

Specification forming part of Letters Patent No. 153,286, dated July 21, 1874; application filed March 14, 1874.

*To all whom it may concern:*

Be it known that I, STEPHEN C. TAFT, of Franklin, in the county of Norfolk and State of Massachusetts, have invented a new and useful Improvement in Car-Brakes, of which the following is a specification:

The invention will first be fully described, and then pointed out in the claim.

Figure 1:
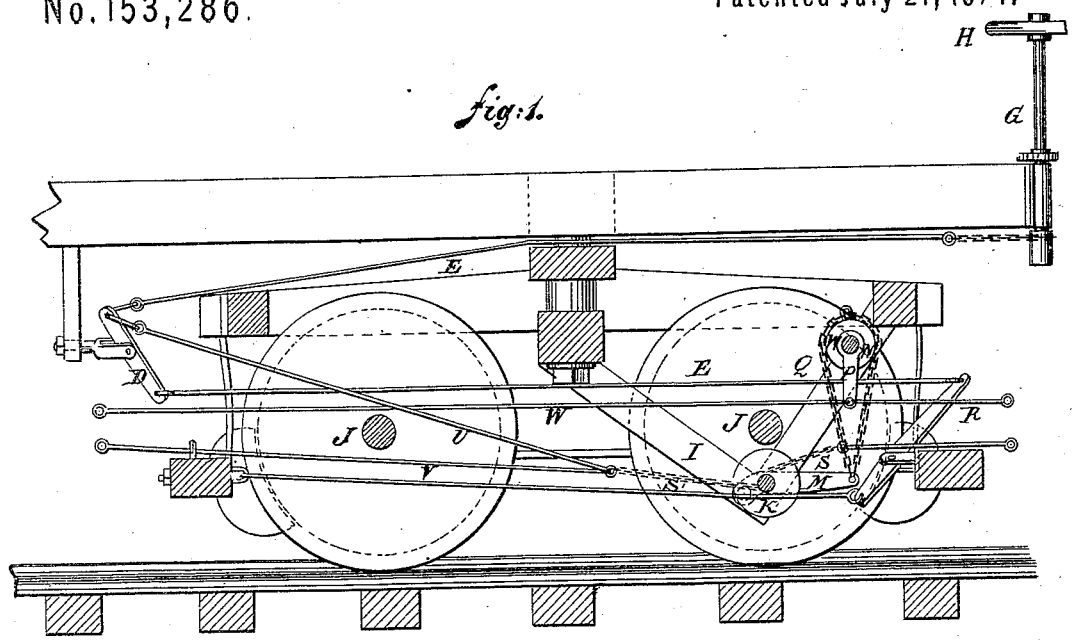
Figure 2:
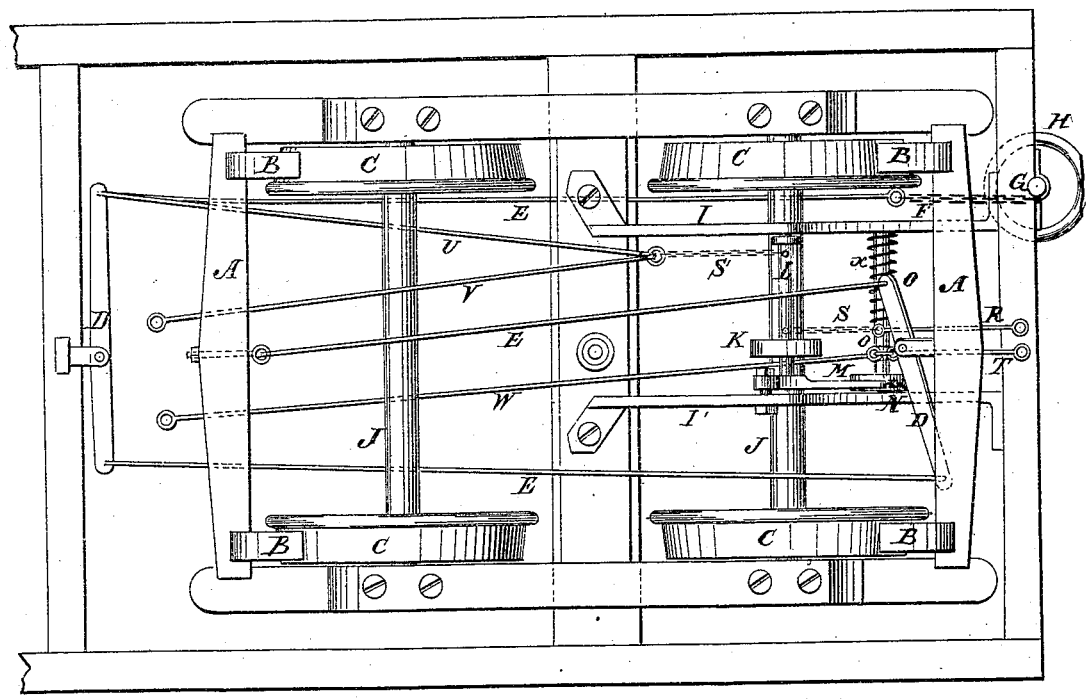

In the accompanying drawing, Figure 1 represents a side elevation of a truck having my improved brake applied. Fig. 2 is a plan view of the reverse side of the truck.

Similar letters of reference indicate corresponding parts.

A A are the ordinary brake-beams of a railroad-truck. B represents the friction-blocks, attached to the beams, arranged to bear against the truck-wheels C. D D are the ordinary brake-levers. E represents the common brake rods or connections. The chain F is wound around the windlass-shaft G of the hand-wheel H. My improvement is applied to the same brake-beams, and operates upon the wheels in the same manner, but by an independent mechanism. I I' are triangular brackets attached to the truck-frame, the angles of which are down, as seen in Fig. 1, and directly below one of the axles, J. K is the friction-wheel on the shaft L. M is a bent lever attached to the bracket I'. One end of the shaft L enters the lever M; the other end is confined in the bracket I. This shaft is free to revolve, one end in the bent lever, and the other in the bracket. N is a chain-wheel on the shaft O. This shaft revolves in the brackets I I'. P is an arm on this shaft, by which the shaft is rocked or turned. Q is a loose friction-chain, which passes around the chain-wheel N, the ends of which are attached to the lever M. (See Fig. 1.) R is a rod attached to the arm P, which extends to the locomotive, and is connected with a windlass-shaft and wheel, which is under the control of the engineer, by means of which he can apply the brakes to all the cars in the train. The connection between the arm P and the locomotive, and the arrangement to give the engineer or other person on the locomotive complete control of the brakes, may be made in any other suitable manner.

When the rod R is drawn toward the locomotive the shaft O is turned, and the friction-chain Q is tightened on the wheel N, which draws on the bent lever M. One end of the friction-wheel shaft L being confined in this lever M, it will be seen that this movement will raise the friction-wheel K and cause it to come in contact with the axle. The axle being revolved rapidly will cause the friction wheel and shaft L to revolve.

S S' are chains, which are wound around the shaft L when that shaft revolves. One of these chains, S, is attached to the rod T, which connects with the brakes of the cars in front. The other chain, S', is attached to the rods U and V, the former of which, U, is connected with the rear brake-lever D. The latter rod, V, is connected with the brakes of the rear cars.

The rock-shaft O is operated or made to turn in either direction, the rod W being attached to the arm P, and has the same effect upon the shaft and friction-wheel as the rod R; consequently it is immaterial which end of the truck is front as regards the action of the friction-wheel K upon the axle.

The connection with the brake-levers, it will be seen, is the same as in the common brake, and the action upon the wheels is the same, but much more powerful. As the wheels cease to revolve the friction-wheel will cease to act, and the cars will stop. The back motion of the rock-shaft O is produced by the spiral spring X, one end of which is attached to the shaft, and the other end to the bracket I.

Having thus described my invention, I claim as new and desire to secure by Letters Patent—

In connection with the axle J and brake mechanism, the combination of the bracket I, the friction-wheel K on shaft L, the lever M, the wheel N, having arm P, the spring-shaft O, and the friction-chain Q, the said arm P being connected with a windlass on the locomotive, as and for the purpose specified.

STEPHEN CLARENDON TAFT.

Witnesses:
WM. B. NOLEN,
GEORGE W. WIGGIN.